United States Patent [19]

Fourgon

[11] Patent Number: 5,772,807
[45] Date of Patent: Jun. 30, 1998

[54] TRUCK TIRE WITH THREAD OF RIB/ GROOVE CONFIGURATION

[75] Inventor: Fernand Antoine Joseph Fourgon, Bastogne, Belgium

[73] Assignee: The Goodyear Tire & Rubber Company, Akron, Ohio

[21] Appl. No.: 715,264

[22] Filed: Sep. 16, 1996

[51] Int. Cl.$^6$ .............................. B60C 1/00; B60C 11/00
[52] U.S. Cl. ....................................... 152/209 R; 524/496
[58] Field of Search .......................... 152/209 R, 209 D, 152/DIG. 3; 524/492, 493, 495, 496; 525/236, 237

[56] References Cited

U.S. PATENT DOCUMENTS

| | | | |
|---|---|---|---|
| 3,830,275 | 8/1974 | Russell | 152/209 R |
| 5,262,213 | 11/1993 | Rodgers et al. | 152/450 |
| 5,294,253 | 3/1994 | Carlson et al. | 524/496 |
| 5,397,616 | 3/1995 | Aoki | 152/209 R |
| 5,405,927 | 4/1995 | Hsu et al. | 152/209 R |
| 5,504,140 | 4/1996 | Zanzig et al. | 525/236 |
| 5,604,286 | 2/1997 | Fuchs et al. | 524/496 |
| 5,612,436 | 3/1997 | Halasa et al. | 525/236 |
| 5,696,197 | 12/1997 | Smith et al. | 152/209 R |

FOREIGN PATENT DOCUMENTS 63-291705  11/1988  Japan ................ 152/209 R

*Primary Examiner*—Steven D. Maki
*Attorney, Agent, or Firm*—Henry C. Young, Jr.

[57] ABSTRACT

The invention relates to a tire with a rubber tread of a cap/base construction with a tread cap of rib/groove configuration in contrast to a tread cap of lug/groove configuration. The tread cap is composed of styrene/butadiene copolymer rubber and isoprene/butadiene copolymer rubber and reinforced with a carbon black blend, and the underlying tread base is composed primarily of natural cis 1,4-polyisoprene rubber reinforced with carbon black. The invention particularly relates to truck tires and to bus tires which are collectively referred to herein as "truck tires".

1 Claim, No Drawings

TRUCK TIRE WITH THREAD OF RIB/GROOVE CONFIGURATION

FIELD

This invention relates to a tire with a rubber tread of a cap/base construction wherein the tread cap is of a rib/groove configuration in contrast to a tread cap of lug/groove configuration. Such tire is intended to be used primarily over roads rather than off-the-road vehicular use. It is intended that the tires of this invention not be of lug/groove configuration composed of a multiplicity of individual tread lugs which are not circumferential around the tire tread in nature but, instead, be directed to tires with a tread cap of a multiplicity of continuous, circumferential, spaced apart ribs with associated, adjoining, grooves between the ribs.

The invention particularly relates to truck tires and bus tires which are collectively referred to herein as "truck tires".

BACKGROUND

Pneumatic rubber tires are conventionally prepared with a tread composed of elastomer(s) reinforced with carbon black (and sometimes with silica or a combination of carbon black and silica).

This invention is more specifically directed to truck tires and other relatively large tires including relatively heavy duty light truck tires, which are normally expected to be capable of supporting and carrying relatively large vehicular loads and, thus, tend to generate a greater internal temperature than comparable passenger vehicle-type tires.

The truck tire treads of this invention are typically of a cap/base construction. The tread cap for this invention has a rib/groove ground-contacting configuration, in contrast to a tread cap of lug/groove configuration, with the outer surfaces of the raised ribs intended to be ground-contacting.

The tread cap ribs extend circumferentially and continuously around the tire. The tread base underlies and supports the tread cap and is positioned between the tread cap and the tire carcass. Generally, the tread cap and tread base are co-extruded together as an uncured component of the tire construction and cured, or vulcanized together with the overall tire construction in a suitable mold under conditions of elevated temperature and pressure. Such constructions and method of preparation are well known to those having skill in such art.

The tread base is not normally intended to be ground-contacting and, thus, not normally intended to have the same measure of tread properties as, for example, the tread cap properties of traction and treadwear.

In practice, for such relatively heavy duty tires, reduced groove cracking is often desired in the grooves of the tread cap having a rib and groove configuration. Usually such groove cracking, when it occurs, can be observed within a tread cap groove at its base portion in the bottom of the groove such as near its center or at its or where its base portion meets the walls of the groove which is sometimes called its "shoulder".

It is envisioned that the tread of a cap/base construction would have tread base primarily reinforced with carbon black. Cap/base constructions, in general, for tire treads is well known to those skilled in such tire tread art. For example, see U.S. Pat. No. 3,157,218.

The term "phr" where used herein, and according to conventional practice, refers to "parts of a respective material per 100 parts by weight or rubber, or elastomer".

In the description of this invention, the terms "rubber" and "elastomer", where used herein unless otherwise prescribed, are used interchangeably. The terms "rubber composition", "compounded rubber" and "rubber compound" where used herein unless otherwise prescribed, are used interchangeably to refer to "rubber which has been blended or mixed with various ingredients or materials" and such terms are well known to those having skill in the rubber mixing, or rubber compounding, art.

The Tg of a polymer, particularly an elastomer, as used herein unless otherwise prescribed, refers to its glass transition temperature which can conventionally be determined, for example, by a differential scanning calorimeter at heating rate of 15° C. to an observed transition of the temperature versus time curve. It is understood that such Tg determination is well known to those having skill in such art.

SUMMARY AND PRACTICE OF THE INVENTION

In accordance with this invention, a pneumatic tire having a tread of cap/base construction with the outer, intended ground-contacting surface of the tread cap having a rib/groove configuration composed of from three to and including seven continuous, circumferential, spaced apart ribs with corresponding two to six associated, adjoining, grooves between the ribs, wherein the tire has a TRA rated maximum load limit of at least about 1220 kg, (2684 lbs), alternatively at least about 2730 kg, (6006 lbs), and generally in a range of about 2043 kg to about 5000 kg, (about 4494 to about 11,000 lbs) at an inflation pressure in a range of about 723 kpa to about 792 kpa (about 105 to about 115 psi) and a bead diameter of at least about 48 cm (19 inches), alternatively at least about 56 cm (22 inches), and generally in a range of about 48 to about 64 cm (about 19 to about 25 inches) provided that, for its cap/base tread construction:

(A) the tread cap is comprised of, based on 100 parts by weight (phr) elastomers (1) elastomers comprised of (a) about 10 to about 40, alternatively about 25 to about 35, phr of organic solution polymerization prepared styrene/butadiene copolymer rubber having a styrene content of about 15 to about 25 percent and a Tg in a range of about −70° C. to about −80° C., (b) about 60 to about 80, alternatively about 65 to about 75, phr of isoprene/butadiene copolymer rubber having an isoprene content in a range of about 40 to about 60 percent and a Tg in a range of about −60° C. to about −90° C., (2) about 40 to about 80, alternatively about 50 to about 70, phr carbon black reinforcing filler as (a) about 60 to about 70 weight percent carbon black having an Iodine adsorption value in a range of about 115 to about 130 g/kg and a DBP number in a range of about 105 to about 118 cm$^3$/100 g and, correspondingly, (b) about 40 to about 30 weight percent carbon black having an Iodine adsorption value in a range of about 105 to about 113 g/kg and a DBP number in a range of about 120 to about 130 cm$^3$/100 g; and (B) the tread base elastomer is cis 1,4-polyisoprene natural rubber reinforced with about 20 to about 60, alternatively about 25 to about 40, phr of carbon black.

In one aspect, the tread cap is of a rib-groove configuration with a multiplicity of spaced apart, continuous, circumferential ribs with associated adjoining grooves between the grooves. The grooves are "adjoining grooves" in a sense that they are positioned between the ribs and are thereby connected, or joined, to the ribs in the tire tread configuration. Such tread cap construction is well known to those having skill in such art and such tires are often intended for road use as compared to off-the-road vehicular use. It is to be appreciated that the ribs may have a multiplicity of sipes, or very small micro grooves, across their outer surface, however, it is considered herein that such ribs are still continuous in nature since it is intended that the sipes are very narrow and very shallow in nature without appreciable width or depth, usually only a few millimeters in depth, and do not extend to the full depth, or base, of the associated grooves in the tread cap. Use of sipes in tread ribs, or tread lugs, is believed to be well known to those having skill in such art.

The aforesaid TRA "maximum rated load limit" characteristic of the tire is intended to present a truck tire typically designed for running under load conditions substantially higher than conventional passenger tire loads and, thus, to differentiate such a truck tire from a typical passenger tire. The term "TRA" refers to "The Tire and Rim Association Inc." which is well known to those familiar with tire manufacturing. The TRA is an association which has, as a purpose ". . . the establishment and promulgation of interchangeability standards for tires, rims and allied parts for the guidance of manufacturers of such products . . . ". The TRA publishes an annual Yearbook, for example the 1995 Yearbook, which includes, for example, characterizations of truck tires and passenger tires, including maximum rated load values at various inflation pressures. It can readily be seen that most truck tires, particularly for medium truck tires and above, have maximum rated load values at various inflation pressures significantly greater than conventional passenger tires. Therefore, it is considered herein that such values effectively differentiate the intended truck tires for this invention from passenger tires. For the purposes of the description of this invention, the rim diameters referenced in the TRA Yearbook are equated to tire bead diameters. Appropriately, the tire bead diameters are herein considered as being measured from the surface of the rubber encapsulated wire beads and not the wire portion of the beads, as is believed herein is appropriate.

As hereinbefore pointed out, it is considered herein that the truck tires, primarily tires having tread configurations having at least one circumferential, substantially continuous, tread rib, and usually bus tires, typically have an appreciably greater need for inhibition of groove cracking within the grooves in the rib/groove surface of the tread cap. Such a rib configuration for a truck or bus tire tread cap intended to be used primarily over roads and not primarily for off-the-road use is believed to be well known to those having skill in such art.

For such purposes of the rib/groove tire tread of this invention, it is considered herein that a tread of cap/base construction is desirable where the tread cap is primarily composed of styrene/butadiene copolymer rubber and isoprene/butadiene copolymer rubber, together with prescribed carbon blacks, and where the tread cap and tread base compositions cooperate to promote such overall effects.

In practice, such cap/base tread construction is created by co-extruding the tread cap and tread base together through a singular die to form the extruded tread construction. Typically, the unvulcanized compounded rubber compositions for the tread cap and tread cap are extruded through the die at a temperature, for example, in a range of about 100° C. to about 125° C., often typically about 110° C. and, thus, is considered as being a relatively hot extrusion process, although such actual extrusion temperatures themselves are considered normal for a rubber extrusion process. The extruded tread stock is then built onto a rubber tire carcass to create an assembly thereof. The assembly is then vulcanized, or cured, at an elevated temperature in which the tire tread rib/groove configuration is formed. Such overall process is well known to those skilled in such art.

In this manner then, by the aforesaid co-extrusion process and the co-vulcanization of the tread cap and tread base, the tread cap and tread base are considered herein to be an integral, cooperative, unit of the tire. Therefore, it is considered herein that the tread cap and tread base desirably cooperate together to promote groove cracking resistance for the tire.

Thus, treadwear, together with an acceptable groove cracking and relatively cool running property for the tire, is intended to be manifested in a longer service life for the tire carcass, or casing.

In particular, the isoprene/butadiene copolymer rubber has a relatively very low Tg in a range of about −60° C. to about −80° C. which is considered herein to be significant and beneficial for the tire tread cap to promote an improvement, or increase, in treadwear.

The solution polymerization prepared styrene/butadiene rubber is considered herein to be significant and beneficial for the tire tread cap in order to promote an improvement, or increase, in treadwear and a reduction in rubber composition tear properties with an increase in resistance in crack propagation.

The utilization of two different carbon blacks of the prescribed properties is considered herein to be significant and beneficial for the tread cap in order to promote an improvement in treadwear and a reduction in heat generation.

Examples of various rubber reinforcing carbon blacks for use in this invention for the tread cap may be found, for example, in *The Vanderbilt Rubber Handbook*, (1978), page 417.

Representative of a carbon black having an Iodine adsorption value of from 105 to 130 g/kg and DBP Number of from 105 to 118 $cm^3$/100 g is, for example, N299.

Representative of a carbon black having an Iodine adsorption value of from 100 to 113 g/kg and DBP Number of from 120 to 128 $cm^3$/100 g is, for example, N234.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silica, and plasticizers, fillers, pigments, fatty acid, zinc oxide, waxes, antioxidants and antiozonants, peptizing agents and reinforcing materials such as, for example, silica and carbon black. As known to those skilled in the art, depending on the intended use of the sulfur vulcanizable and sulfur vulcanized material (rubbers), the additives mentioned above are selected and commonly used in conventional amounts.

Typical amounts of processing aids comprise about 1 to about 30 phr. Such processing aids can include, for example, aromatic, napthenic, and/or paraffinic processing oils and blends of various fatty acids such as, for example, various zinc based soaps.

Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344–346. Typical amounts of antiozonants comprise about 1 to about 5 phr. Typical amounts of fatty acids, if used, which can include stearic acid, usually commercially provided as a blend of stearic acid and other similar fatty acids such as palmitic acid, etc, comprise about 0.5 to about 4 phr.

Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, with a range of from about one to about 2.5, being preferred.

Accelerators are used to control the time and/or temperature required for vulcanization and to improve the properties of the vulcanizate. Retarders are also used to control the vulcanization rate. In one embodiment, a single accelerator system may be used, i.e., primary accelerator. Conventionally and preferably, a primary accelerator(s) is used in total amounts ranging from about 0.5 to about 4, preferably about 0.8 to about 2.5, phr. In another embodiment, combinations of a primary and/or a secondary accelerator might be used, with the secondary accelerator being used in amounts of about 0.05 to about 3 phr, for example, in order to activate and to improve the properties of the vulcanizate. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the use of silica as a reinforcing filler in combination with a coupling agent in a prescribed rubber blend.

The presence and relative amounts of the above additives are not considered to be an aspect of this invention, except as may hereinbefore be set forth, of the present invention which is more primarily directed to the truck tire with required size and load characteristics which utilizes a tread of cap/base construction with specified combinations of elastomers in the tread cap and tread base with the tread base elastomer being reinforced with carbon black, and tread cap elastomers being reinforced with a filler of prescribed precipitated silica and carbon black, with the silica required to be used in conjunction with a silica coupler.

The tire can be built, shaped, molded and cured by various methods which will be readily apparent to those having skill in such art.

The invention may be better understood by reference to the following examples in which the parts and percentages are by weight unless otherwise indicated.

EXAMPLE I

A rubber composition (compounded rubber) was prepared of organic solution polymerization prepared styrene/butadiene copolymer rubber and isoprene/butadiene copolymer rubber and is referred to herein as "Sample B". A Control rubber composition composed of natural rubber (cis 1,4-polyisoprene and cis 1,4-polybutadiene rubber) was prepared and referred to herein as Control "Sample A".

The rubber compositions were prepared by mixing the ingredients in several sequential non-productive mixing stages (without the curatives) followed by a final productive mixing stage.(basically for the curatives), then the resulting composition was cured under conditions of elevated temperature and pressure, namely, for about 32 minutes for about 150° C.

For the non-productive mixing stages, exclusive of the accelerator(s), sulfur curatives, and part of the antioxidants which are added in the final, productive mixing stage, the ingredients were mixed in the first non-productive stage except that the carbon black was added in the first non-productive mix stage(s). The ingredients may be mixed in each of the non-productive mixing stages for about one to about five minutes to a temperature of about 165° C., all in a Banbury internal type of mixer.

To the resulting rubber composition (mixture) may be then mixed, in the final, productive mixing stage, the remaining ingredients in a Banbury internal type mixer for about one to about two minutes to a temperature of about 120° C.

The rubber was then used to prepare a tire tread which was built onto a tire carcass to form a tire assembly thereof and the tire assembly vulcanized under conditions of elevated temperature and pressure to form a tire with tread having a tread cap of rib/groove configuration.

The rubber composition was comprised of the ingredients illustrated in Table 1. The values, for the most part, are simply rounded to the nearest whole number.

TABLE 1

| Sample | A | B |
|---|---|---|
| Non-Productive Mix Stages | | |
| Natural Rubber[1] | 30 | |
| Polybutadiene[2] | 30 | |
| IBR[3] | | 70 |
| S-SBR[4] | | 30 |
| Carbon Black[5] | 47.5 | |
| Carbon Black[6] | | 42.5 |
| Carbon Black[7] | | 22.5 |
| Processing Oil | 4 | 25 |
| Fatty Acid | 1 | 2 |
| Plasticizers/Resins/Waxes | 1 | 1.5 |
| Productive Mix Stage | | |
| Zinc Oxide | 3 | 3 |
| Antioxidant[8] | 2.1 | 4.1 |
| Sulfur | 1.8 | 1.4 |
| Accelerator | .85 | 1.2 |

[1] Cis 1,4-polyisoprene natural rubber.
[2] Cis 1,4-polybutadiene rubber obtained as NEO Cis BR 40 from the Enichem company.
[3] Isoprene/butadiene copolymer rubber having an isoprene content of about 30 percent and a Tg of about −83° C. obtained from The Goodyear Tire & Rubber Company.
[4] Organic solution polymerization prepared styrene/butadiene copolymer rubber having a styrene content of about 18 percent and a Tg of about −70° C. obtained as S1210 from the Shell Holland company.
[5] N347 carbon black.
[6] GPT (General Purpose Thermal) carbon black having Iodine and DBP values of about 108 and 124, respectively.
[7] N299 carbon black.
[8] Of the diarylparaphenylene diamine and dihydro-trimethylquinoline type.

Various properties of the cured samples were determined by conventional means and reported in the following Table 2.

TABLE 2

| Sample # | A | B |
|---|---|---|
| 300% Modulus (MPa) | 9.1 | 7.2 |
| Tensile Strength (MPa) | 22.7 | 19.4 |
| Elongation (%) | 585 | 615 |
| Hardness Shore A | 56 | 62 |
| Rebound (100° C.) | 63 | 52 |
| Flexometer Temperature (°C.) | 26.6 | 40.2 |
| E' at 100° C. (MPa) | 8.5 | 10.8 |
| Tan. Delta at 100° C. | .069 | .08 |
| Tear resistance (N/mm) | 44 | 26 |

The lower hot Rebound (100° C.) value for experimental Sample B, as compared to Control Sample A show a predictive higher heat generation between the full synthetic rubber composition for Sample B and the control natural rubber/cis 1,4-polybutadiene composition Sample A. The hot rebound value is indicative of the rubber composition's hysteresis which, in turn, is predictive of a measure of potential internal heat generation for the rubber composition during dynamic working conditions. This is considered herein to be beneficial because equal heat generation would tend to indicate that tire tread life for tires with treads of the two rubber compositions, at least as relates to heat durability, might be substantially equivalent.

Also, the higher 300 percent dynamic modulus value for experimental Sample B, as compared to Control Sample A is indicative of higher stiffness. Such property is predictive of a tire tread with rubber composition of experimental Sample B as having better treadwear as well as improved dry handling when mounted on a wheel on a vehicle and operated under working conditions as compared with a similar tire with a tread composed of the rubber composition of Control Sample A.

In particular, it is considered herein that rubber composition properties of the experimental tire tread cap rubber composition B taken together with tire base composition Y, particularly when compared with comparative control composition A, are predictive that a cap/base tread construction of this invention will provide a tire with enhanced treadwear while having substantially equivalent heat buildup.

Regarding the various tests, for the tensile elongation and 300% modulus values tests, refer to ASTM Test D412-92, method B.

For the rebound tests, refer to DIN 53512.

For the hardness, Shore A, as in ASTM 2240-91, may be referred to at room temperature, or about 23° C.

For the flexometer test, refer to ASTM Test D623. The flexometer test is considered herein to be significant because it specifically measures the temperature rise in the rubber test sample and the dimensional changes of the sample over time. The flexometer test is well known to those skilled in rubber composition evaluations particularly for use in tires.

For the E' values, which are sometimes referred to as the "tensile storage modulus", reference may be made to *Science and Technology of Rubber*, second edition, 1994, Academic Press, San Diego, Calif., edited by James E. Mark et al, pages 249–254. The use of the storage modulus, E', to characterize rubber compositions is well known to those having skill in such art.

The tangent delta, or tan. delta, is a ratio of the tensile loss modulus, also known as E", to the tensile storage modulus (E'). These properties, namely the E', E" and tan. delta, characterize the viscoelastic response of a rubber test sample to a tensile deformation at a fixed frequency and temperature, measured at 100° C.

The tan. delta and tensile storage modulus (E') are well known to those skilled in the rubber composition characterization art, particularly as relates to tires and tire treads. The tensile storage modulus (E') values are indicative of rubber compound stiffness which can relate to treadwear rates and evenness of treadwear. The tan. delta value at 100° C. is considered as being indicative of hysteresis, or heat loss.

EXAMPLE II

Tires of size 10.00–20, 16PR-10PA where produced with treads of co-extruded cap/base construction with the tread base being of the Sample Y composition and the tread cap being rubber compositions shown as experimental Sample B and Control Sample A of Example I herein as demonstrated in Table 1 and correspondingly identified herein as experimental tire B and Control tire A. The tread cap outer, intended, ground-contacting, surface was of a rib/groove configuration with five continuous circumferential spaced apart ribs with four associated, adjoining, grooves between the ribs. Each rib had a multiplicity of sipes on its surface which, for the purposes of this invention, the ribs are still considered as being continuous, particularly since the sipes were only on the surface of the ribs and did not extend deeply into the grooves and certainly not the bottoms of the grooves.

The tires were tested by tire testing procedures with results shown in the following Table 3. The values for the Control Tire A are normalized to values of 100 and the associated values for Tire B is recited with values comparative to the values for the Control Tire A.

TABLE 3

| Test Values | Tire A | Tire B |
|---|---|---|
| Endurance (ECE 54) | 100 | 100 |
| Rolling Resistance | 100 | 85 |
| Treadwear | 100 | 125 |
| Chevron Rib Tear Number of Damages | 62 | 11 |

Table 3 shows that the tire of this invention demonstrated a dramatic reduction in tendency to groove crack as evidenced by an inferior number of damages according to the Chevron Rib Tear test and also free of groove cracks after the treadwear test. The number of damages referenced in Table 3 refers to the number of cracks observed in the bottom of the tread groove adjacent to a tread rib.

Table 3 shows that the tire of this invention was observed to provide a dramatically increased treadwear value in a range of about 116 to about 119, an average range of values for two tests of four tires each. It is considered that this benefit, as compared to the Control Tire A, is primarily due to the tread cap rubber composition utilized for the tire, namely the combination of the cis 1,4-polyisoprene rubber, isoprene/butadiene copolymer rubber and cis 1,4-polybutadiene rubber together with the carbon black and silica reinforcement (with its attendant silica coupler), in combination with the tread base of cis 1,4-polyisoprene rubber composition.

The recited Chevron Rib Tear Test is conducted by mounting the appropriate tire(s) on a rim on a wheel of an appropriate vehicle and the vehicle driven on a road course which has raised v-shaped (Chevron-shaped) portions on the road bed and the nature of the damages can be described as groove cracking—rib tearing. A higher number of damages is considered a worse performance. The groove cracking within the groove is the first stage of tread rib tearing. For example, rib tear is most often a consequence of tread groove cracking of the shoulder region of the groove in the area where the base of the groove meets the wall of the groove.

The recited endurance values are according to ECE (European regulation), test No. 54 for tire endurance. The comparative tire endurance values show that Tire A ran slightly longer before failing, an indication that somewhat less internal heat is generated by tire B. This result is considered very significant because the experimental tire tread cap/base combination B resulted in considerably better wear with substantially equivalent heat generation. The improved wear is beneficial for tired life on a tread wear basis and the substantially equivalent heat generation is also beneficial for tire endurance, or tire life.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a tread of a cap/base construction including a tread cap and a tread base where said tread cap has from three to and including seven continuous, circumferential, spaced apart ribs with from two to six corresponding associated, adjoining, grooves between the ribs, wherein at least one of said ribs has a multiplicity of sipes on the surface of the rib, wherein said tire has a TRA rated maximum load limit in a range of about 2043 kg to about 5000 kg, at an inflation pressure in a range of about 723 to about 792 kpa and a bead diameter in a range of about 48 to about 64 cm (about 19 to about 25 inches) characterized in that, for its tread of cap/base construction:

(A) the tread cap is comprised of, based on 100 parts by weight (phr) elastomers (1) elastomers comprised of (a) about 25 to about 35 phr of organic solution polymerization prepared styrene/butadiene copolymer rubber having a styrene content of about 15 to about 25 percent and a Tg in a range of about −70° C. to about −80° C., (b) about 65 to about 75 phr of isoprene/butadiene copolymer rubber having an isoprene content in a range of about 40 to about 60 percent and a Tg in a range of about −60° C. to about −90° C., (2) about 50 to about 70 phr carbon black reinforcing filler as (a) about 60 to about 70 weight percent carbon black having an Iodine adsorption value in a range of about 115 to about 130 g/kg and a DBP number in a range of about 105 to about 118 $cm^3/100$ g and, correspondingly, (b) about 40 to about 30 weight percent carbon black having an Iodine adsorption value in a range of about 105 to about 113 g/kg and a DBP number in a range of about 120 to about 130 $cm^3/100$ g; and (B) the tread base comprises cis 1,4 -polyisoprene natural rubber reinforced with about 20 to about 60 phr of carbon black.

\* \* \* \* \*